US010716971B1

(12) United States Patent
Oberc et al.

(10) Patent No.: US 10,716,971 B1
(45) Date of Patent: *Jul. 21, 2020

(54) GAME IMPLEMENTS AND SYSTEM FOR TRACKING OR LOCATING SAME

(71) Applicant: MITCHELL O ENTERPRISES LLC, Highland, IN (US)

(72) Inventors: Steven M. Oberc, Highland, IN (US); Hare K. Patnaik, Rochester Hills, MI (US); Subramaniam Ganesan, Rochester Hills, MI (US)

(73) Assignee: MITCHELL O ENTERPRISES LLC, Griffith, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,886

(22) Filed: Dec. 12, 2018

Related U.S. Application Data

(63) Continuation-in-part of application No. 15/163,290, filed on May 24, 2016, now Pat. No. 10,232,225.

(Continued)

(51) Int. Cl.
*A63B 69/36* (2006.01)
*A63B 37/00* (2006.01)
(Continued)

(52) U.S. Cl.
CPC .......... *A63B 37/0054* (2013.01); *A63B 43/00* (2013.01); *A63B 24/0003* (2013.01);
(Continued)

(58) Field of Classification Search
CPC . A63B 24/0003; A63B 24/0006; A63B 69/36; A63B 69/3655; A63B 69/3658;
(Continued)

(56) References Cited

U.S. PATENT DOCUMENTS

| 6,908,404 B1 | 6/2005 | Gard |
| 7,059,974 B1 | 6/2006 | Golliffe et al. |

(Continued)

FOREIGN PATENT DOCUMENTS

| CN | 103706088 A | 4/2014 |
| KR | 1020070093169 A | 9/2007 |

(Continued)

OTHER PUBLICATIONS

U.S. Appl. No. 15/163,290, Non-Final Rejection, dated Aug. 13, 2018.

(Continued)

*Primary Examiner* — Steven J Hylinski
(74) *Attorney, Agent, or Firm* — Winston & Strawn LLP

(57) ABSTRACT

A system for locating an electronic game implement such as an electronic golf ball. The electronic game implement has an outer shell and internal core, with the core containing graphene coated electronics and a battery, wherein the associated electronics of the electronic game implement includes a processor and transceiver configured to measure data including acceleration, speed, travel trajectory and final location while also being configured to transmit the measured data via a communications protocol. The ball or sports game implement that includes the associated electronics are also an embodiment of the invention. The system includes a smart device having associated electronics to communicate with the electronic game implement ball, with the associated electronics of the smart device including a processor configured to receive the measured data from the electronics of the electronic game implement.

20 Claims, 7 Drawing Sheets

SAMPLE ELECTRONICS INSIDE GOLF BALL

Related U.S. Application Data

(60) Provisional application No. 62/169,194, filed on Jun. 1, 2015, provisional application No. 62/661,947, filed on Apr. 24, 2018.

(51) Int. Cl.
*A63B 43/00* (2006.01)
*A63B 102/32* (2015.01)
*G06K 9/00* (2006.01)
*A63B 24/00* (2006.01)

(52) U.S. Cl.
CPC ........... *A63B 24/0006* (2013.01); *A63B 69/36* (2013.01); *A63B 69/3632* (2013.01); *A63B 69/3655* (2013.01); *A63B 69/3658* (2013.01); *A63B 2102/32* (2015.10); *A63B 2209/00* (2013.01); *A63B 2220/20* (2013.01); *A63B 2220/40* (2013.01); *A63B 2220/833* (2013.01); *A63B 2225/54* (2013.01); *G06K 9/00342* (2013.01); *G06K 9/00375* (2013.01)

(58) Field of Classification Search
CPC ........... A63B 69/3632; G06K 9/00342; G06K 9/00375
See application file for complete search history.

(56) References Cited

U.S. PATENT DOCUMENTS

| | | | |
|---|---|---|---|
| 7,091,863 B2 | 8/2006 | Ravet | |
| 7,095,312 B2 | 8/2006 | Erario et al. | |
| 7,789,742 B1 | 9/2010 | Murdock et al. | |
| 7,970,734 B2 | 6/2011 | Townsend et al. | |
| 8,206,246 B2 | 6/2012 | Joseph et al. | |
| 8,231,506 B2 | 7/2012 | Molyneux et al. | |
| 8,257,191 B2 | 9/2012 | Stites et al. | |
| 8,353,791 B2 | 1/2013 | Holthouse et al. | |
| 8,446,255 B2 | 5/2013 | Balardeta et al. | |
| 8,465,376 B2 | 6/2013 | Bentley | |
| 8,540,583 B2 | 9/2013 | Leech | |
| 8,696,482 B1 | 4/2014 | Pedenko et al. | |
| 8,702,430 B2 | 4/2014 | Dibenedetto et al. | |
| 8,747,242 B2 | 6/2014 | Erario et al. | |
| 8,801,529 B2* | 8/2014 | Koudele | A63B 43/00 473/151 |
| 8,941,723 B2 | 1/2015 | Bentley et al. | |
| 8,989,441 B2 | 3/2015 | Han et al. | |
| 9,129,153 B2 | 9/2015 | Ianni et al. | |
| 9,186,568 B2 | 11/2015 | Ianni et al. | |
| 9,233,292 B2 | 1/2016 | Joseph et al. | |
| 9,254,432 B2 | 2/2016 | Ianni et al. | |
| 9,492,724 B2 | 11/2016 | Thurman et al. | |
| 9,927,525 B2* | 3/2018 | Zimmerman | G01S 19/19 |
| 10,062,027 B2* | 8/2018 | Komatsu | A63B 37/0075 |
| 10,232,225 B1* | 3/2019 | Oberc | A63B 69/3632 |
| 2002/0077189 A1 | 6/2002 | Tuer et al. | |
| 2002/0091017 A1 | 7/2002 | Kuesters | |
| 2002/0188359 A1 | 12/2002 | Morse | |
| 2005/0164808 A1 | 7/2005 | Sasaki | |
| 2005/0233815 A1 | 10/2005 | McCreary et al. | |
| 2005/0259002 A1* | 11/2005 | Erario | A63B 24/0021 342/357.61 |
| 2006/0148594 A1 | 7/2006 | Saintoyant et al. | |
| 2008/0207357 A1* | 8/2008 | Savarese | A63B 24/0021 473/407 |
| 2010/0117837 A1 | 5/2010 | Stirling et al. | |
| 2010/0151955 A1 | 6/2010 | Holden | |
| 2010/0305843 A1* | 12/2010 | Yan | G01C 21/20 701/533 |
| 2011/0081978 A1 | 4/2011 | Murdock et al. | |
| 2011/0130230 A1 | 6/2011 | Solberg et al. | |
| 2011/0207553 A1 | 8/2011 | Reid et al. | |
| 2011/0305369 A1 | 12/2011 | Bentley et al. | |
| 2012/0088544 A1 | 4/2012 | Bentley et al. | |
| 2012/0142443 A1 | 6/2012 | Savarese et al. | |
| 2012/0234094 A1 | 9/2012 | Starzynski | |
| 2012/0255999 A1 | 10/2012 | Luciano, Jr. et al. | |
| 2012/0303207 A1 | 11/2012 | Reindl | |
| 2013/0053190 A1 | 2/2013 | Mettler | |
| 2013/0128022 A1 | 5/2013 | Bose et al. | |
| 2013/0167290 A1 | 7/2013 | Ben Ezra | |
| 2013/0184091 A1 | 7/2013 | Rauchholz et al. | |
| 2013/0316840 A1 | 11/2013 | Marks | |
| 2014/0002266 A1 | 1/2014 | Rayner | |
| 2014/0128171 A1 | 5/2014 | Anderson | |
| 2014/0347193 A1* | 11/2014 | Ljung | H04L 67/04 340/870.01 |
| 2015/0072811 A1* | 3/2015 | Jolliffe | A63B 71/0619 473/570 |
| 2015/0105173 A1* | 4/2015 | Thurman | G09B 19/0038 473/199 |
| 2015/0154452 A1* | 6/2015 | Bentley | G06K 9/00711 386/201 |
| 2015/0255184 A1* | 9/2015 | Li | H01L 23/29 428/336 |
| 2015/0375062 A1* | 12/2015 | Farrell | A63B 37/0093 473/376 |
| 2016/0096067 A1 | 4/2016 | Ianni et al. | |
| 2016/0096071 A1 | 4/2016 | Ianni et al. | |
| 2016/0292469 A1 | 10/2016 | Ianni et al. | |
| 2016/0317896 A1* | 11/2016 | Albelo | A63B 69/3614 |
| 2017/0128814 A1 | 5/2017 | Ianni et al. | |

FOREIGN PATENT DOCUMENTS

| | | | |
|---|---|---|---|
| WO | 2005/116944 A2 | 12/2005 | |
| WO | 2006/119563 A1 | 11/2006 | |
| WO | WO-2006119563 A1 * | 11/2006 | ............. A63B 43/00 |
| WO | 2011/008082 A1 | 1/2011 | |
| WO | 2014/042402 A2 | 3/2014 | |
| WO | 2015/075108 A1 | 5/2015 | |

OTHER PUBLICATIONS

U.S. Appl. No. 15/163,290, Notice of Allowance, dated Dec. 3, 2018.

* cited by examiner

Sample Display on Android Phone / iPhone

GAME IMPLEMENTS AND SYSTEM FOR TRACKING OR LOCATING SAME

CROSS-REFERENCE TO RELATED APPLICATIONS

This application is a continuation-in-part of application Ser. No. 15/163,290 filed May 24, 2016 which claims the benefit of application No. 62/169,194 filed Jun. 1, 2015. This application also claims the benefit of application No. 62/661,947 filed Apr. 24, 2018. The entire content of each application is expressly incorporated herein by reference thereto.

FIELD OF THE INVENTION

The present invention relates to systems and methods for obtaining golf-related data, and in particular, to systems and methods involving the electronics in a golf ball and a smart device for obtaining golf-related data relating to the travel and location of the ball.

BACKGROUND OF THE INVENTION

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well-known golf superstars, at least in part, have increased golf's popularity in recent years, both in the United States and across the world.

Golfers at all skill levels seek to improve their performance and sometimes they can lose their golf balls after a poor swing or mishit during practice due to a relatively large green playing field, often having to forego searching for their lost golf balls and constantly replace their golf balls. Manufacturers of all types of golf equipment have responded to these demands, and in recent years, the industry has witnessed dramatic changes and improvements in golf equipment and related devices. For example, a wide range of different golf ball models now are available, with balls designed to track their locations, expedite searches for lost golf balls, and complement specific swing speeds and/or other player characteristics or preferences. Golf clubs also have been modified to include multiple variations, such as variations in the loft angle, lie angle, offset features, and weighting characteristics of the club head (e.g., draw biased club heads, fade biased club heads, neutrally weighted club heads, etc.). Moreover, the club heads may be combined with a variety of different shafts, e.g., from different manufacturers; having different stiffness, flex points, kick points, or other flexion characteristics, etc.; made from different materials; etc. Between the available variations in shafts and club heads, there are literally hundreds of different club head/shaft combinations available to the golfer.

Additionally, mobile devices and computer systems have been utilized to obtain data from golf equipment and to provide analysis and other data based on the obtained data. They also have been employed to video record athletes' motion before and after swinging. The obtained data and analysis and the recorded motions may aid golfers to improve their performance and body mechanics.

Despite the aforementioned golf balls, golf clubs, and mobile devices, currently those equipment and devices still lack certain electronic components and interaction with each other in manners that can more efficiently and accurately obtain and transmit golf-related data. As such, there remains a need for a golf system that is improved over what is known in the art and which solves the above deficiencies.

SUMMARY OF THE INVENTION

The present invention relates to a golf ball including one, two or preferably all of a gyroscope, an accelerometer, and a magnetometer to provide data related to movement of the golf ball, wherein each of the gyroscope, the accelerometer, and the magnetometer of the golf ball is configured to measure data related to the golf ball after the golf ball is struck.

The golf ball is preferably paired with a smart device including a processor and a non-transient or non-volatile memory, wherein the processor is configured to calculate additional data using data related to and obtained from the golf ball. The processor is configured to calculate additional data using only the data related to the golf ball with the measured data preferably stored in the non-transient memory with a time stamp.

For optimum operation, the golf ball further comprises a wirelessly chargeable power source. The processor is typically a Bluetooth low energy processor or similar type of processor.

Each of the gyroscope, accelerometer, and magnetometer in the golf ball may be and preferably is coated with graphene deposited by chemical vapor deposition.

A more general aspect of the invention relates to a system for obtaining sport-related data comprising a ball or game implement having associated electronics to measure data related to the ball or game implement; with the ball or game implement paired with a smart device that has associated electronics to communicate with the ball or game implement, with the associated electronics of the smart device comprising a processor configured to calculate additional data using data related to and obtained from the ball or game implement. Also, the associated electronics of the ball or game implement comprise a processor and transceiver configured to measure acceleration of the ball or game implement while also being configured to transmit the measured acceleration of the ball or game implement to the smart device via a communications protocol.

In this system, the ball or game implement may be a golf ball, baseball, football, basketball, hockey puck, soccer ball, tennis ball, bowling ball, javelin, discuss, shot-put, badminton birdie or arrow. Thus, a player or participant in any of these sports or similar activities can monitor his or her performance in order to receive data in real time with a goal of increasing their skills or prowess at playing the game or obtaining better form or abilities.

Additionally, when combined with GPS coordinates, the system can track the path of the ball or game implement as well as determine its location when it comes to rest after being hit, thrown or shot. This is most useful for finding golf balls after being driven from the tee, but it can also be useful for determining a final position that can be used for measuring the initial distance before the implement hits the ground as well as its final location after movement has ceased.

The invention also provides a ball or sports game implement that provides sports related data and that includes the associated electronics disclosed herein. The processor of the golf ball is preferably programmed with algorithms based on Fibonacci sequence, with the processor and transceiver configured to measure acceleration by using the algorithms based on the Fibonacci sequence. The transmission of the measured acceleration from the ball or game implement is facilitated by the graphene in the processor and transceiver. As noted herein, the measured acceleration is transmitted to a smart device having associated electronics to communicate with the ball or sports game implement, the associated electronics of the smart device comprising a processor configured to receive the measured data from the associated electronics of the ball or sports game implement.

Counterpart methods and computer-readable medium embodiments would be understood from the above and the overall disclosure. Also, to emphasize, broader, narrower, or different combinations of described features are contemplated, such that, for example features can be removed or added in a broadening or narrowing way.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

The golf ball of the present invention is now configured in its core with appropriate electronics and a battery for collecting and transmitting golf ball to the person that is using the ball in play.

The invention also provides a system for locating a golf ball comprising a golf ball having an outer shell and internal core, with the core containing graphene coated electronics and a battery, wherein the associated electronics of the golf ball comprise a processor and transceiver configured to measure data including acceleration, speed, travel trajectory and final rest location of the golf ball while also being configured to transmit the measured data via a communications protocol; and a smart device having associated electronics to communicate with the golf ball, the associated electronics of the smart device comprising a processor configured to receive the measured data from the electronics of the golf ball.

In this system, the electronics in the golf ball include a processor and transceiver, a 3-axis gyroscope, a 3-axis accelerometer, and a 3-axis magnetometer and the graphene coating is non-conductive or insulative in order to allow communication from the electronics to pass thorough the coating. The outer shell of the golf ball preferably comprises an ionomer resin while the core comprises a polybutadiene polymer. The graphene coated electronics may be provided with an additional moisture resistant coating to prevent water or moisture from contacting the graphene coating or electronics. Also, the ball can include one or more additional layers between the core and outer shell to further protect the core and electronics.

The smart device that is used in this system preferably is a smart tablet or smart phone that includes an app that calculates ball location, ball travel, ball velocity, or ball trajectory from the data provided by the electronics from the ball through the cloud. When looking for a hit or played ball, the app measures how close the golf ball is to the smart device with different colors used to indicate different distances between the smart device and the ball.

Figure 1:
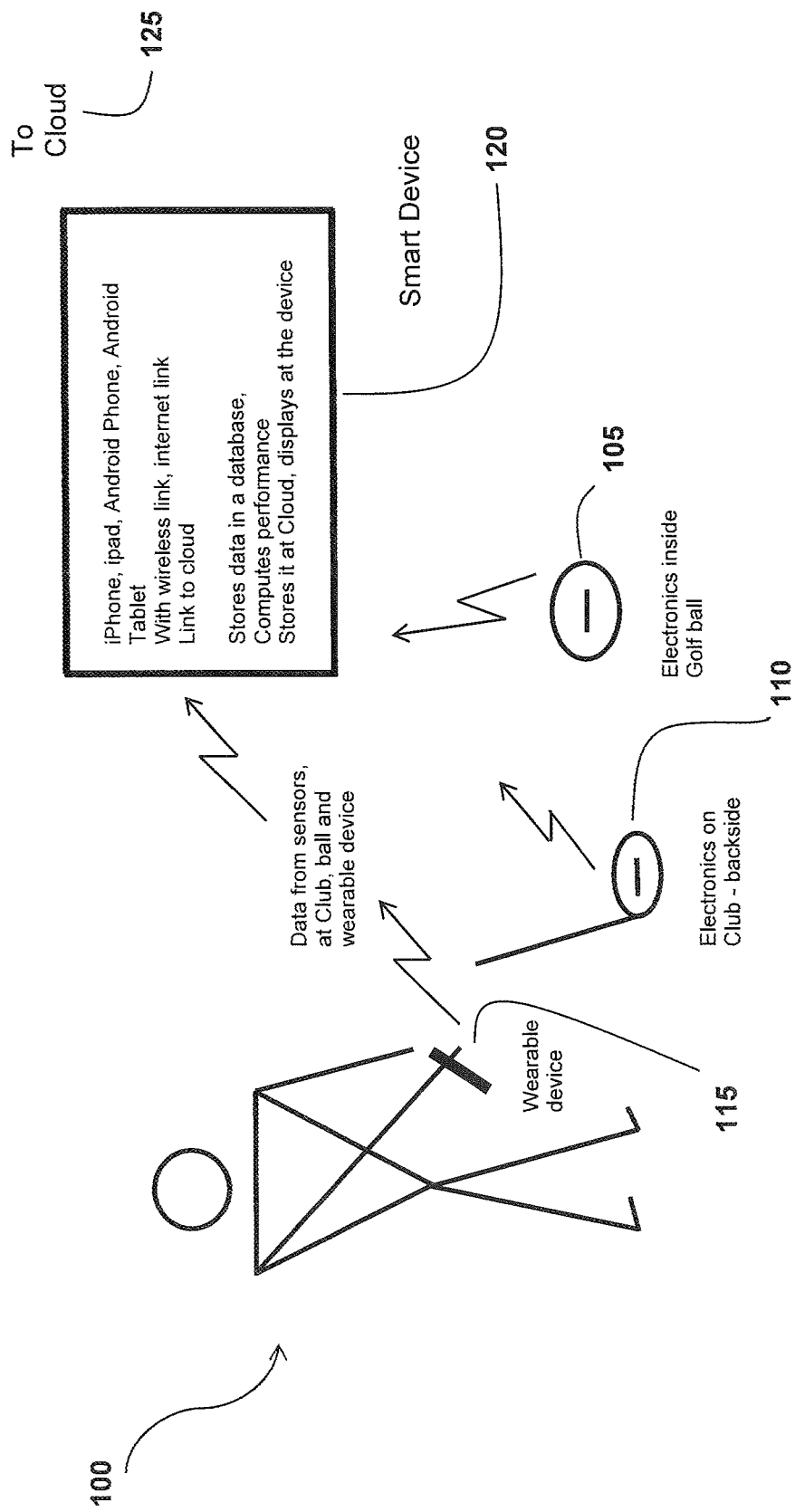
FIG. 1 depicts an illustrative system for obtaining golf-related data in accordance with some embodiments of the present invention.

Preferred embodiments of the present invention now will be described more fully hereinafter with reference to the accompanying drawings. Referring to FIG. 1, one embodiment of the system for obtaining golf-related data is illustrated. The system may comprise a golf ball 105, a golf club 110, a wearable device 115, and a smart device 120. Each of the golf ball 105, golf club 110, and wearable device 115 may contain a plurality of electronics that can obtain golf-related data. The obtained data may be uploaded to the Cloud 125 for later retrieval and viewing by the golfer, audience, or any other interested individuals at any location.

Figure 2:
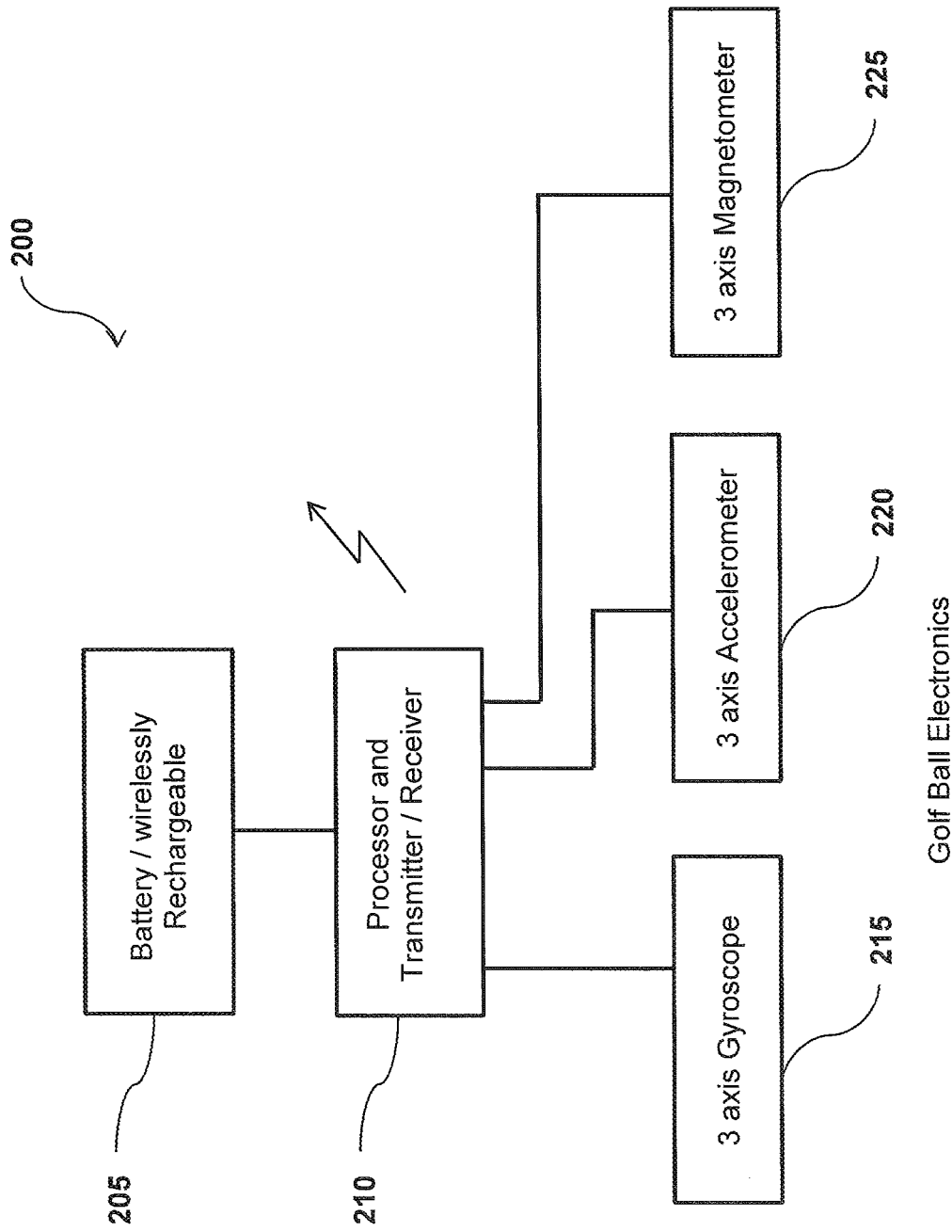
FIG. 2 depicts illustrative golf ball electronics in accordance with some embodiments of the present invention.

The present invention focuses on the golf ball 105 and the data that may be obtained from it when played or in play. Referring to FIG. 2, one preferred embodiment of the golf ball electronics 200 is illustrated. The golf ball electronics 200 may include a power source 205, a processor and transceiver 210, a 3-axis gyroscope 215, a 3-axis accelerometer 220, and a 3-axis magnetometer 225. The gyroscope 215, the accelerometer 220, and the magnetometer 225 may be collectively referred to as sensors. In some embodiments, the golf ball electronics 200 may comprise only a power source 205, a processor and transceiver 210, and a 3-axis gyroscope 215 or a 3-axis accelerometer 225 or of both. The power source 205 is electrically and directly connected to the processor and transceiver 210 to power the processor and transceiver 210. The processor and transceiver 210 is electrically and directly connected to each of the gyroscope 215, accelerometer 220, and magnetometer 225 to execute the functions of each of the gyroscope 215, accelerometer 220, and magnetometer 225. The processor and transceiver 210 serve as an intermediary electrical connection between the power source 205 and each of the gyroscope 215, accelerometer 220, and magnetometer 225. A transmitter or receiver may also be employed instead of the transceiver.

The power source 205 may be a battery. The battery may be rechargeable or non-rechargeable. When the battery is rechargeable, the recharging may be wired or wireless. In a preferred embodiment, the battery is wirelessly rechargeable. Wireless charging or inductive charging uses an electromagnetic field to transfer energy between two objects. This is usually done with a charging station. Energy is sent through an inductive coupling to an electrical device, which can then use that energy to charge batteries or run the device. Wireless chargers typically use an induction coil to create an alternating electromagnetic field from within a charging base station, and a second induction coil in the portable device takes power from the electromagnetic field and converts it back into electrical current to charge the battery. The two induction coils in proximity combine to form an electrical transformer. Greater distances between sender and receiver coils can be achieved when the inductive charging system uses resonant inductive coupling. This resonant system may include using a movable transmission coil i.e. mounted on an elevating platform or arm, and the use of advanced materials for the receiver coil made of silver plated copper or sometimes aluminum to minimize weight and decrease resistance due to the skin effect. The inductive charging technology or electronics employed by the present invention protects the battery from overcharging, eliminates unnecessary discharging when the battery is not charging, and stops charging when the battery is full.

The processor or processing circuitry is operative to control the operations and performance of the gyroscope 215, the accelerometer 220, and the magnetometer 225. For example, the processor can be used to run operating system applications, and firmware applications of those sensors or other applications used by those sensors to communicate with each other or with the sensors in the golf ball, the golf club, and the wearable device. The processor is connected to the transceiver, and via the transceiver or without via the transceiver, the processor can retrieve data from the gyroscope 215, the accelerometer 220, the magnetometer 225, and one or more of the electronics in the golf club, the wearable device, and the smart device, process those data, and store processed or unprocessed data in a transient or non-transient memory. Transient memory may be RAM or other types of memory used for temporarily storing data. Non-transient memory may be ROM, EPROM, EEPROM, and flash memory the like. In a preferred embodiment, the non-transient memory is a flash memory. All the data may be stored in the same or different memory. The processor can initiate and halt the operation of the gyroscope 215, the accelerometer 220, and the magnetometer 225.

The transceiver in the golf ball transmits and receives data from the transceiver in the golf club, the wearable device, and the smart device. The transceiver in the golf club, the wearable device, and the smart device also perform similarly. The transceiver can be a wireless communications integrated circuit designed to implement a particular wireless communication protocol. The transceiver handles wireless protocol interactions and functions such as modulation and transmission. The communication protocol may be WiFi, Bluetooth, 802.11, Bluetooth, radio frequency systems such as 900 MHz, 1.4 GHz, and 5.6 GHz communication systems, infrared, GSM, GSM plus EDGE, CDMA, quadband, and/or any other suitable protocol. A transmitter or receiver may also be employed instead of a transceiver. All the above features work equally with the transmitter or receiver if that is the electronic used.

In a preferred embodiment, both the processor and the transceiver employ Bluetooth low energy (BLE) technology to consume considerably less power while maintaining their normal processing power and communication range.

The 3-axis gyroscope 215 measures golf ball rotation and produces golf ball rotation data in three axes $g_{1x}$, $g_{1y}$, and $g_{1z}$. The 3-axis accelerometer 220 measures golf ball acceleration and produces golf ball acceleration data in three axes $a_{1x}$, $a_{1y}$, and $a_{1z}$. The 3-axis magnetometer 225 measures golf ball magnetism and produces golf ball magnetism data in three axes $m_{1x}$, $m_{1y}$, and $m_{1z}$. Either or both of the gyroscope 215 and the accelerometer 220 may further measure golf ball motion and produce golf ball motion data. These sensors may be activated upon detection of the motion of the golf ball or prior to a golf game. All of the above data may be stored in a transient or non-transient memory located in the golf ball to prevent loss of data due to loss of communication with the smart device. Transient memory may be RAM or other types of memory used for temporarily storing data. Non-transient memory may be ROM, EPROM, EEPROM, and flash memory the like. In a preferred embodiment, the non-transient memory is a flash memory. All the data may be stored in the same or different memory. This memory may be the same memory as the one utilized in the processor or be a different memory. The golf ball electronics may be configured to store any of the data in this memory, the memory in the processor, or both memories. It may also be helpful to include additional data in the memory when such data relates to the performance of the ball. For example, wind velocity and direction can have an effect on ball travel and including this information in memory for processing can be helpful in eliminating the effects of wind on the ball travel compared to what the ball would do just based on the strike of the club. The wind velocity can be manually input into memory from course data, weather data or after being measured. It may be possible to configure one of the sensors to measure this information prior to flight or after landing.

Each of the gyroscope 215, accelerometer 220, and magnetometer 225 may be configured to measure, produce, and/or store its corresponding data periodically and to send that data or a copy of that data to the smart device through the communication protocol discussed above. In a preferred embodiment, each of the gyroscope 215, accelerometer 220 and magnetometer 225 is configured to measure, produce, and/or store its corresponding data on a 30 Hz basis. Each of the gyroscope 215, accelerometer 220, and magnetometer 225 may also be configured to measure, produce, and/or store its corresponding data on a 30 Hz basis at the same time or different time. For example, all of the gyroscope 215, accelerometer 220, and magnetometer 225 may start measuring, producing, and/or storing its corresponding data on a 30 Hz basis at the moment the golf ball is struck by the golf club. In another example, the gyroscope 215 may start measuring, producing, and/or storing its data at the moment the golf ball is struck by the golf club, the accelerometer 220 may start measuring, producing, and/or storing its data at a first time after the golf ball is struck, and the magnetometer 225 may start measuring, producing, and/or storing its data at a second time after the golf ball is struck. The first time may occur before, after, or at the same time as the second time.

Using one or more of the above data, additional data such as effective acceleration, angle of golf ball flight, and impact force on the golf ball may also be obtained with the following equations:

$$\text{Effective Acceleration of the Golf Ball } a_{1e} = \sqrt{a_{1x}^2 + a_{1y}^2 + a_{1z}^2}$$

$$\text{Angle of Golf Ball Flight} = \tanh^{-1} \text{ of } a_{1x}, a_{1y}, \text{ and } a_{1z},$$

$$\text{Impact Force on Golf Ball } (F1) = \text{Mass of Golf Ball} \times a_{1e}$$

The mass or weight of the golf ball is pre-measured before incorporating the golf ball electronics and may be stored in the memory of the processor or in any of the sensors. The mass on average is about 45 grams, with tolerance of ±1 gram.

Figure 3:
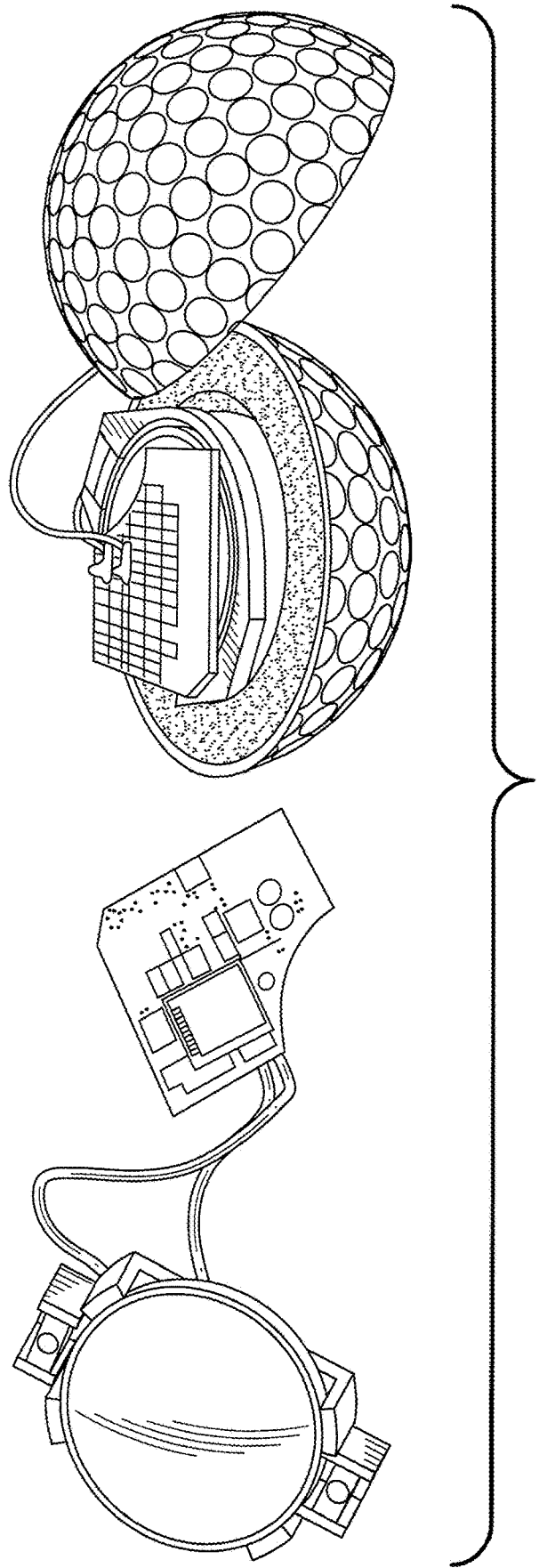
FIG. 3 depicts an example of the golf ball electronics inside a golf ball in accordance with some embodiments of the present invention.

In a preferred embodiment, the algorithms for calculating the effective acceleration, angle of the golf ball flight, and impact force on the golf ball are stored in the smart device and those additional data are calculated by the smart device after the accelerometer 220 transmits its acceleration data to the smart device. The accelerometer 220 only provides acceleration data or acceleration data necessary to calculate effective acceleration and angle of golf ball flight, and does not perform any calculation or the calculation of effective acceleration and angle of golf ball flight. Similarly, the gyroscope 215 and the magnetometer 225 only provide their corresponding data to the smart device and any calculation based on those corresponding data is performed on the smart device. In another preferred embodiment, the algorithms are stored in the processor 210 or the memory of the processor 210 and the calculations of those additional data are performed by the electronics in the golf ball before transmitting the data obtained by the sensors to the smart device. FIG. 3 shows an example of the golf ball electronics inside the golf ball.

The golf ball may be wirelessly connected to the smart device through a communication protocol described above to track the location of the golf ball. The location of the golf ball may be tracked by one or more of the electronics in the golf ball and through the data and additional data provided by the electronics in the golf ball and/or the smart device. The location of the golf ball may also be tracked by adding a Global Positioning System (GPS) into the golf ball. The display of the smart device may indicate that the golf ball is less than 50 feet away with a first color (such as a red color ring), that the golf ball is less than 25 feet away with a second color (such as a yellow color ring), and that the golf ball is less than 10 feet away with a third color (such as a green color ring). The golf ball or the smart device may also produce sound as the golfer goes near the golf ball and the sound may be louder or different as the golfer approaches closer to the golf ball.

In order to compensate for the loss of wireless communication between the ball and smart device, the ball electronics have sufficient storage to retain the information until communication is reestablished. Also, the data collection does not begin until the ball is struck and the data is only collected and stored while the ball is in motion. Of course, there is nothing to be gained by collection of data while the ball is stationary except for its position upon landing so that the user can more easily find the ball when it is hit off the course.

With a system comprising the above golf ball, golf club, wearable device, and their associated electronics, the system in one embodiment can obtain golf-related data in the following manner:

Before the strike: No data collection or parameter calculation.
After the strike: Collects data continuously at 30 Hz. The collected data is stored in golf ball to prevent loss of data due to loss of communication with smart device. The ball also sends a copy of stored data to smart device via a communication protocol.
Upon ceasing of motion: Provides data as to location or position In this embodiment, some or all of the golf ball electronics are configured to perform data measurement only after the golf ball is struck and calculations of parameters related to the golf ball are performed by the smart device. In this instance, data fusion of all data and parameters at the smart device occurs after the golf ball is struck and the electronics transmit data measurement to the smart device.

In this embodiment, the system may be configured such that only the golf ball electronics are collecting data after the golf ball is struck. The golf ball electronics perform no data collection or parameter calculation before the golf ball is struck. After collecting the data, the transceiver of the golf ball may transmit the collected data to the smart device for parameter calculation.

In another embodiment, the processor of the golf ball may perform parameter calculations after data collection and transmit the calculated parameters to the smart device for display. In this situation, the smart device performs no calculations. Once parameter calculation is initiated, either before or after the golf ball is struck, parameter calculation may be performed by only the processor, by the combination of the processor and one, some, or all of the sensors, or by only the smart device after data measurement has been transmitted to the smart device.

Figure 4:
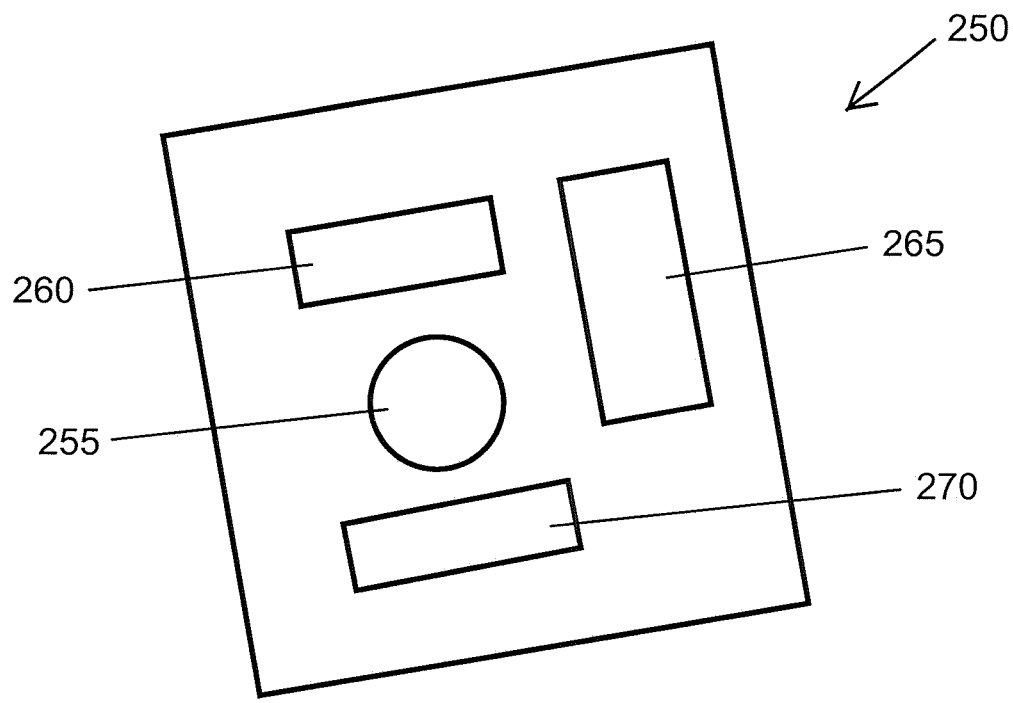
FIG. 4 depicts a flextronic circuit with identified electronic components.

FIG. 4 depicts another flextronic circuit for use in the golf ball of the present invention. The flexboard will contain an electronic oscillator for RF communication and a combination chip with a 9 axis gyroscope, accelerometer and magnometer. A single sided flex board 250 would include a power source or battery 255, an ARM microprocessor 260 having Bluetooth capability and including a transceiver, an MPU 265 that is a 9250 9axis, that includes a gyroscope, accelerometer and magnetometer, and an electronic oscillator 270. The 1 mm QFN package, is the world's smallest 9axis Motion Tracking device and incorporates the latest design innovations enabling dramatically reduced chip size and power consumption at the same time improving performance and cost.

The MPU 9250 is a system package that combines two chips, the MPU-6500, which contains a three axis Gyroscope. A three axis accelerometer and on onboard digital motion processor (DMP) capable of processing Motionfusion algorithms, and the AK8963, which is the market leading three axis digital compass. The MPU-9250 supports Inventsense's market proven Motionfusion in low power battery consumption. Additionally, a single or dual arm core chip can be used.

The electronic oscillator 270 that is also included on the flexboard is an RF oscillator that produces signals in the radio frequency (RF) range of about 100 kHz to 100 GHz. The oscillator is designed to produce a high power AC output from a DC supply. The most common form of a linear oscillator is an electronic amplifier such as a transistor or operational amplifier connected in a feedback loop with its output feedback into its input through a frequency selective electronic filter to provide positive feedback. When the power supply to the amplifier is first switched on, electronic noise in the circuit provides a non-zero signal to oscillations strayed. The noise travels through the loop and is amplified and filtered until very quickly it converges on a sine wave at a signal frequency.

These components provide data after the ball is struck regarding velocity, distance traveled, flight trajectory and final resting location. The data is transmitted to a smart phone via a wireless communications link over the Internet where the transmitted data is stored in the cloud. It is accessible by the smart phone where it can be displayed to show data such as ball location and other previously measured or calculated properties such as flight distance, flight trajectory, flight speed, etc.

The current flexboard is now available in a ¼ by ¼ inch size which is desirable as it can be placed within the core to allow for good the strike of the ball without affecting performance of the electronics. Smaller size electronics are of course even more preferred and current semiconductor developments should lead to making this component smaller in the future. The smaller sizes are preferred as they also provide more insulation when the ball is struck.

The use of the flexboard in the golf ball provides the following advantages:
1) Reductions or elimination of wiring errors
2) Eliminates mechanical connectors
3) Unparalleled design flexibility
4) More robust operating temperature range
5) Stronger signal quality
6) Improved reliability and independence control
7) Size and weight reduction.

There are many additional benefits to the use of flexible circuits including:
1) Assembly error reductions
2) Decreased assembly times and costs
3) Design freedom for highly complex configurations that can withstand hostile environments. They also can be single or double combinations, provide shielding, be ridged or flexible.
4) The ability to provide highly dense applications. Denser device populations and lighter conductors can be designed into the product, freeing space for additional features.
5) Because of their streamline design, flex-circuits allow for cooling through the electronic application.
6) Due to the large surface to volume ratio and compact design, a shorter thermal path is allowed. Further the thinner design of flex circuits allows for heat dissipation from both sides of the circuit.
7) A flexible circuit can move and flex up to 500 million times without failure in designs that have moving parts. The thermal stability of polyimide provides a better flexboard base compared to conventional circuit boards. The exceptional thermal stability of polyimide also allows the circuit to withstand applications with extreme heat.
8) Flex circuits contain the thinnest dielectric substrates available. Thinness allows for a more streamline design, eliminating the need for bulky rigid boards. The elasticity and flexibility allow package size reduction. With ever increasing demands, weight reduction keeps flex circuits very cost competitive.

The battery or power source 205 or 255 is needed to operate the electronics. The smallest size useful batteries found so far are size 13 hearing aid batteries due to the size and power consumption. Today's hearing aide are in effect mini-computers. Processing is measured in MIPS or million instructions per second. The battery is rated at 150 milliamperes which should provide at least 100 hours of power. Charging will be done via wireless. Due to innovations today, hearing aid batteries available from Rayovac and others have twice as much energy as the zinc batteries manufactured in the 1980's and 1990's.

The battery to power the electronics can include improved anode materials. These batteries may contain graphene components that will enhance the power for Bluetooth 5 power consumption. In one embodiment, then anode material is a $LiCoO_2$ material. Silicon-graphene nanocomposites are also useful as anode materials in lithium ion batteries as disclosed in US patent application 2014/0255785 A1, the entire content of which is expressly incorporated herein for a further understanding of such batteries. These are desirable for use in the present invention due to the increased strength of the silicon-graphene material which can resist repeated club strikes on the ball without affecting battery supply and electronics activation. Additional suitable anodes are disclosed in https://newatlas.com/crumpled-graphene-balls-batteries/53047/.

This battery has essentially the same dimensions as a conventional size 13 hearing aid battery due to size of strike expected on the golf ball as well as providing the necessary power to support a Bluetooth 5 transmission range of up to 800 feet. In addition, Bluetooth 5 is adaptable to generation 5 phones for data transfer to the cloud. This size battery can easily fit within the core as well as withstand the strike of the ball. Bluetooth 5 is well known and is a newer more desirable wireless communications protocol. See http://www.trustedreviews.com/news/what-is-bluetooth-5-2947121.

The flexboard is coated with non-conductive graphene so that the data can be transmitted from the core of the ball. Graphene is almost completely transparent in that it transmits about 97-98% of light compared to about 80-90% for a basic single pane of window glass. By choosing the right deposition process, graphene can be made nonconductive or as an insulator while also providing very high strength. This material is preferred for protecting the current flexboard before introducing it into the core of the golf ball. The thickness of the coating is sufficient to cover the flexboard and components so that they are protected from moisture migration and to some extent from impact due to club strikes on the ball.

The battery and power leads can also be coated with graphene, although this does not appear to be mandatory because embedding those components in the core of the ball adjacent the flexboard leads to acceptable performance. The polybutadiene core surrounding the flexboard and battery then provides a spherical outer configuration.

In the chemical vaporization of the flexboard prior to encapsulation in the spherical core of the ball, graphene films will be grown to a thickness of 25 μm on the flexboard. This is accomplished by placing the flexboard in a 10 cm CVD furnace at temperatures from 900 to 1000 degrees. Micro-Raman mapping will be used to characterize the Graphene films. Spectroscopy will show that the majority of the flexboard to be covered with multilayer Graphene, with some monolayer and bilayer patches. Comparing optical concentrations, time, temperature, pressure and cooling rate will be manipulated to try to decrease the amount of multilayer graphene (3 or more layers). The best growth will result in a 33% of monolayer and bilateral and the rest multilayer graphene from the sample provided.

In addition to providing the strength to the flexboard in the spherical center of the ball, the graphene coating will enhance the Bluetooth signal. Graphene has special properties including mechanical strength and electrical insulation or electrical conduction depending upon how it is deposited. This is an important first step in advancing wireless signal processing. Similar to a cell phone, the same chip will be put into the golf ball or other Sports "objects" that's used for the data processing of statistics.

Graphene, a single atomic layer of carbon, is the strongest material known to man, and also has electrical properties superior to the silicon used to make the chips found in modern electronics. The combination of these properties makes Graphene an ideal material for nanoelectromechanical Systems (NEMS) which are scaled down versions of microelectromechanical (MEMS) used widely for sending of vibration and acceleration. For example, MEMS sensors figure out how your smartphone or tablet is tilted to rotate the screen.

Graphene's mechanical 'stretchability' can time the output frequency to the oscillator can be used to create modulated FM signals creating a nanochemical version of the electronic component known as a voltage controlled oscillator. (VCO).

The graphene preferably contains a mixture that will allow certain processes to be non-conductive, allowing for radio waves to pass through the entire ball. Non-conductive graphene will preferably be put on the flexboard as it will not short the pins on the chips.

The graphene coated electronics are further provided with an additional moisture resistant coating to prevent water or moisture from contacting the graphene coating or electronics. The additional coating is a conformal coating of silicone, acrylic, urethane, etc., as are available from Miller Stephenson (https://www.miller-stephenson.com/chemicals/conformal-coating/). A conformal coating is ideal for providing insulation against high voltage arcing and corona shorts, while also providing ideal protection for both ridged and flexible printed circuit boards. The coating can be transparent to assure that the electronics are coated. This coating will not fragment or crack. Preferably a urethane conformal coating is used. A urethane conformal coating provides superior toughness and abrasion resistance and excellent protection from humidity and organic solvents. Polyurethane coatings are available as either aerosol or bulk formulations. Both formulations provide excellent humidity resistance and far greater chemical resistance than acrylic coatings. Single component polyurethanes are easy to apply, enjoy long pot life and are subjected to a cure cycle to achieve full or optimum properties. The cure cycle can be accelerated by the application of heat typically reducing cure times to less than 4-5 hours at 50% humidity. Such a coating provides further protection of the flextronic board and electronics.

Figure 5:
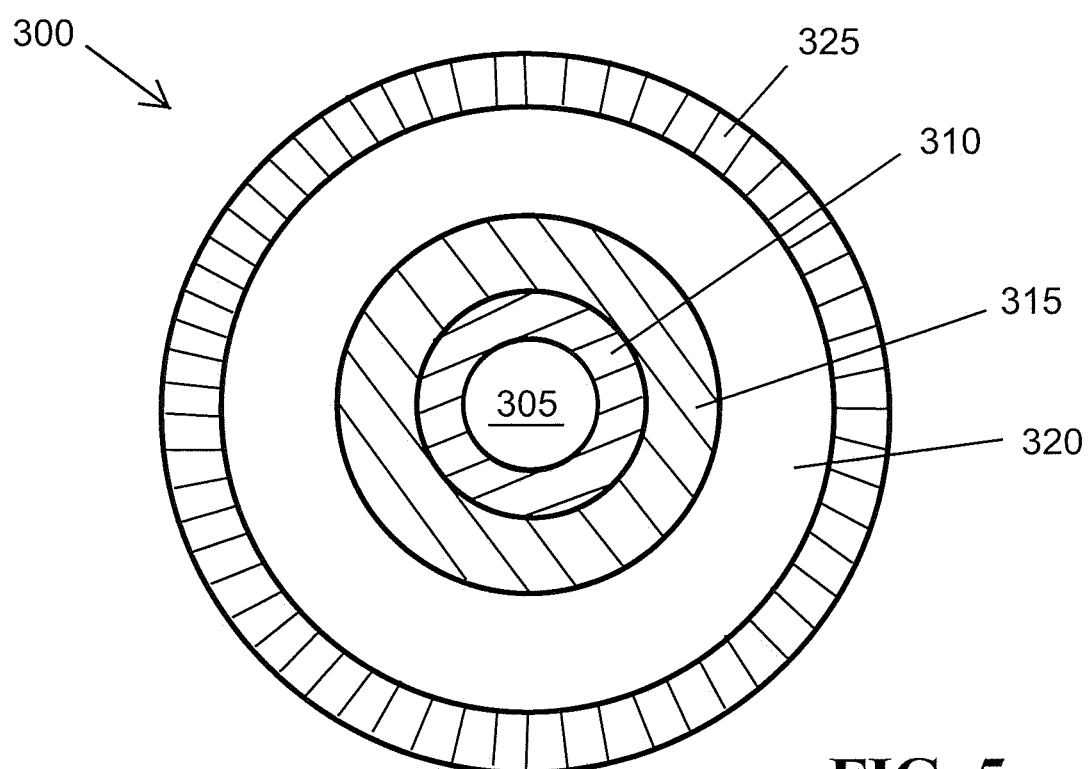
FIG. 5 is a cross-section of a golf ball according to the invention.

FIG. 5 is a cross-section of a golf ball according to the invention. While not currently listed on the conforming list of balls approved by the United States Golf Association. (USGA), the present golf ball 300 does not weigh more than 1.620 ounces and has a minimum diameter of 1.6820 inches. The ball has a maximum initial ball velocity of 250 feet per second (plus a maximum 2% tolerance) as measured on a standard USGA Ball Testing Machine, and a maximum distance of 317 yards (plus a maximum 3 yard tolerance). The present golf ball also is not designed, manufactured, or intentionally modified to have properties that differ from those of a spherically symmetric ball. Currently, the current ball will be as a trading ball and will later seek USGA approval.

Golf ball 300 is a molded type two piece golf ball that has a core 305 and cover 325. The core is a polymer core which is typically made of polybutadiene. The process of making the ball includes compression molding the polymer polybutadiene around the coated flextronic board and battery. The polybutadiene protects the coated flextronic board and electronics.

The core 305 can include a second core layer 310 for additional strength and protection of the electronics. If desired, the ball 300 can include one or more mantle layers 315, 320. The result is a spherical object onto and around which the cover 325 is molded. Dimples are included in the die so that the step of injection molding of the cover produces a nearly finished golf ball with clean up and paint being performed to finish it.

The golf ball 300 can simply include a spherical core of e.g., polybutadiene with the embedded Graphene Based flextronic board chip. One or more outer layers surrounding the spherical core, including, for example, a durable blended polymer that can withstand the compression of a golf club.

The spherical core is solid and can be a polymer matrix composite, a metal matrix composite, or a nano-structured material. The spherical core typically may include a blend of components, wherein one of the components is an injected molded polymer, a compression molded polymer, a compression milder polymer or elastomer or combination of both with the graphene coated chip or flexboard embedded therein. The accelerometer, magnetometer, high-performance GPS and broadcast communication chip, along with the self-charging battery, are embedded within the core that is 0.9 inches in diameter. It is estimated that the embedded electronics can withstand upward of 20,000 G's of acceleration force.

The golf ball typically requires a cover 325 which has an outer surface with conventional dimples (not shown) and an inner surface opposite of the outer surface that defines a cavity. The spherical core in the cavity comprises a polymer matrix composite and has a stiffness of 400 MPs to 200 Gpa. The polymer matrix composite preferably includes an inorganic strengthening phase. The strengthening phase may include silicon nitride, silicon carbide, titanium carbide, titanium diboride, aluminum oxide, zirconium oxide, boron carbide, carbon fiber, carbon nanotubes, or even graphene. The strengthening phase is from 5 to 80 weight % of the spherical core. The polymer matrix complex can also be made from other polymers, e.g., nylon, polyethylene, or acrylonitrile butadiene stryrene (ABS). The polymer may also include an elastomer. There may be one or more additional strengthening or mantle layers between the spherical core and the cover layer. The spherical core has an Ati compression from 110 to 200 and a coefficient greater than 7.

The cover 325 may be made from a polyurethane, balata, polybutadiene, synthetic elastomers or any material suitable for use as a golf ball cover. As noted, the preferred material is Surlyn® resin. The cover layer also forms the golf ball diameter. In an embodiment, the golf ball diameter is approximately 42.67 mm (1.68 inches), but it can also be of any diameter equal or greater than or less than 42.67 mm that is capable for play. A preferred core 305 is made of a polymer such as polybutadiene.

In another aspect, the golf ball comprises a cover 325 and a spherical core 305 with only one additional layer e.g., 320 therebetween. This forms two-part spherical body with the additional layer. A conventional mantle layer can be used as the additional layer. Alternatively, a nanostructured material can be used as the additional layer and it can include carbon steel, stainless steel or titanium and have a grain size of less than 1 μm. The nanostructural material also can include a nanometer sized strengthening phase. If desired, one or more additional layers can be provided between the spherical core and the cover layer.

The following equation describes the deflection of a three piece golf ball when struck during a high impact collision. The vapor deposited graphene on the flexboard in the core will protect it. It should be noted that although this equation describes the deflection of a three piece ball, the analysis is equally valid for other types of balls by adding or reducing terms. For example in the case of a two piece ball one would set the portion relating to the mantle layer to zero.

$$D = (d \text{ cover } x(F) + d \text{ mantle } x(F) + d \text{ Core } x(F))x$$

where D is the total deformation of the ball (i.e., deflection of all layers), F is the force to the ball, d cover x(F) is the deflection of the cover layer, d mantle x(F) is the deflection of the mantle layer, and d core(F) is the deflection of the spherical core.

The deflection of each layer of a golf ball is related to its thickness and the layer's modulus which can be a non-linear function with respect to applied force. The deflection for a particular layer can vary depending on the layer's composition but can be calculated to confirm acceptable properties and performance.

If desired, various other layers can be included between the core and the outermost cover. Between two and six cover layers can be added. It is possible to use additional mantle layers (between the core and cover layers) but the compression molded polybutadiene core can be and is often used without any additional layers.

The cover 325 of the ball 300 is preferably made of a Surlyn® resin. The term "Surlyn® resin" refers to a family of DuPont ionomer resins which are high-performance ethylene copolymers containing acid groups partially neutralized using metal salts such as zinc, sodium and others. The material is an ionically strengthened thermoplastic having enhanced physical properties compared to polyurethanes or conventional plastics. Golf ball covers made of Surlyn® resins exhibit a combination of desirable properties including resilience, broad hardness and stiffness range, and excellent resistance to cuts and abrasion, all of which are ideal for golf ball applications. Different commercial grades of Surlyn® resins are available for golf ball manufacture and these are included in the term "ionomer resins" as used herein.

One or more polymers and one or more strengthening phases may be used over the spherical core fabricated of a polymer matrix composite. There is no restriction on the type of the material that can be used, except that final composite must meet the design requirements for a golf ball (e.g., modulus, toughness, surface finish). These one or more polymers and one or more strengthening phases from a mixture offer a set of properties not available in any single material. Injection molding polymers for the current core composite compromising the Graphene flexboard include, but are not limited to, nylon, polystyrene, acrylonitrile butadiene styrene (ABS) and combinations thereof. Ceramics can be used as the strengthening phase is in the polymer matrix composite included but are not limited to, for example, silicon nitride ($Si_3N_4$), silicon carbide (SiC), aluminum oxide ($AlO_3$), zirconium oxide ($ZrO_2$), boron carbide ($B_4C$) and the like. Graphene and other materials can be used as a strengthening phase and may provide significant stuffing of a polymer or elastomer when used in a polymer matrix composite as described above. Furthermore, elastomers may also be employed as the matrix or mixed with a polymer to provide the matrix.

In an alternative embodiment, a material set that comprises a polymer matrix composite can be used. For example, a Hexafluoroproplyene VF 2 Vinylidene Fluoride ("HFP") resin from DuPont provides an injected molded matrix that is filled with 20 to 45 weight % ceramic particulate and or fiber such as silicon carbide (SiC) fibers or whiskers.

It is also possible to prepare a three piece ball-polymer composite core with the Graphene flexboard comprising DuPont HFP 1000 or HFP 200 resins blended with silicon carbide whiskers at a loading of 30 weight %, a second polymer compromising a polybutadiene elastomer and a cover made of Surlyn® resin. The core is constructed with an outside diameter of 0.90 inches (0.22 millimeters) polybutadiene with a layer thickness of 0.330 inches (8.38 millimeters) and the Surlyn® resin cover at a thickness of 0.060 inches (1.52 millimeters). The total mass of the ball is 1.620 ounces (45.93 grams) with an outer diameter of 1.680 inches (42.67 millimeters).

The three piece ball-polymer composite core comprising a Graphene flexboard, a block amide (PEBAX material sold under the name PEBAX made by Arkema Group) resin blended with silicon nitride fibers at a loading of 40 Percent by weight, a second polymer layer compromising a DuPont HPF 1000 or HPF 200 resin and an ionomer cover.

The golf ball electronics measure the various parameters and transfer the data into the cloud. The data is received by a smart phone app which then can review or process the received data. After a golf ball is played and comes to rest, the smart phone app can locate the ball using GPS data and algorithms. The app measures how close the golf ball is to the smart device. Different colors are used to indicate proximity with red being an indication of the golf ball being very far (greater than 75 feet) away, yellow indicating that you are coming closer to the ball, i.e., within 50 feet, and green used to indicate that you are within 10 feet of the ball. This enables the player to find a lost or mis-hit ball such as one that is hit off the fairway or into an area where the player cannot visually view the ball. This device can assist in finding many of these balls to allow the player to retrieve them to continue playing the game without taking penalty strokes. It is also possible to gather additional statistics while ball is in the air: Swing Analysis, Force of strike, flight velocity every 0.1 seconds, ball rotation, acceleration, rotation, wind velocity, distance to the pin and final landing location.

Figure 6:
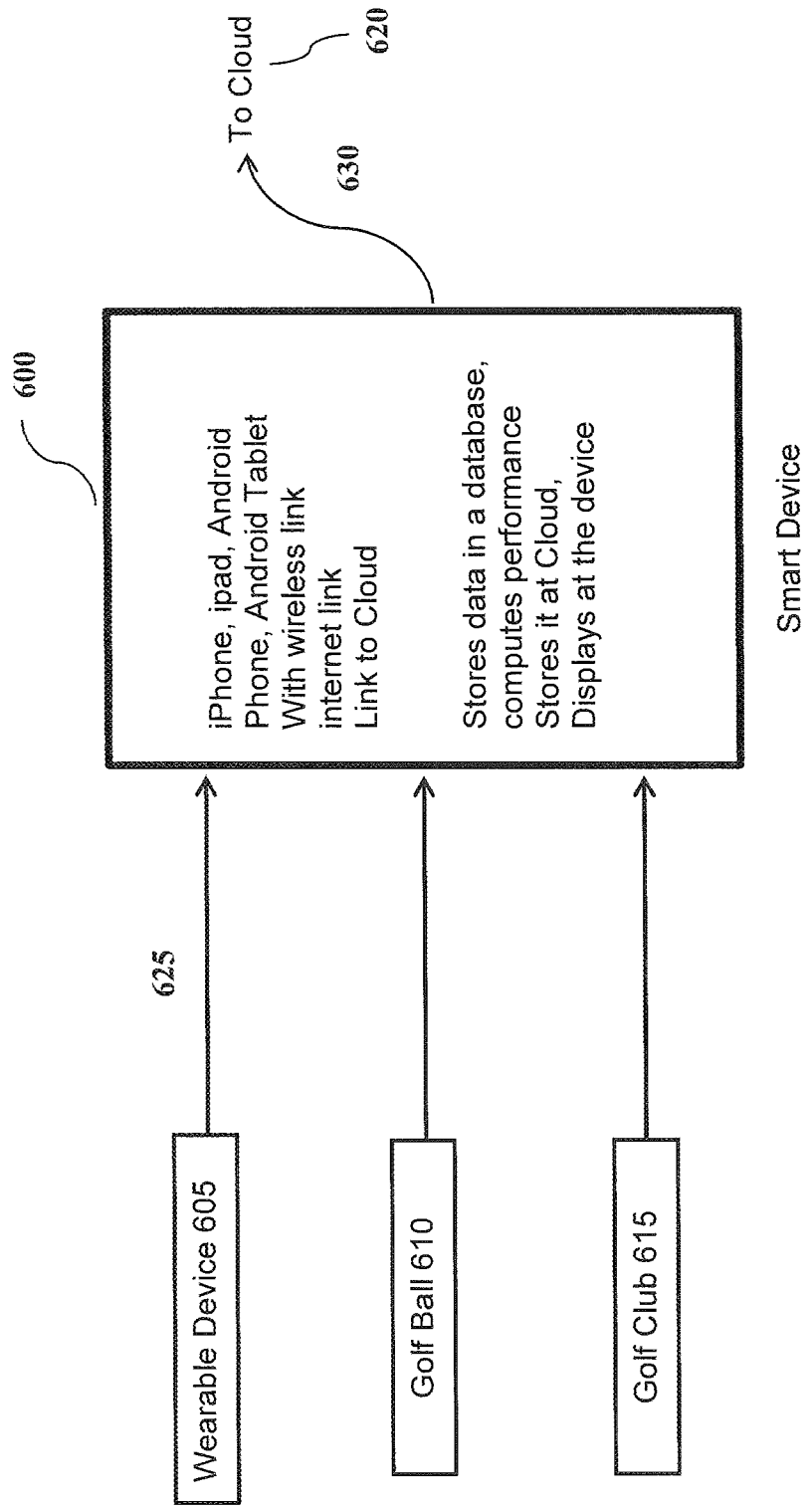
FIG. 6 depicts an illustrative smart device in accordance with some embodiments of the present invention.
Figure 7:
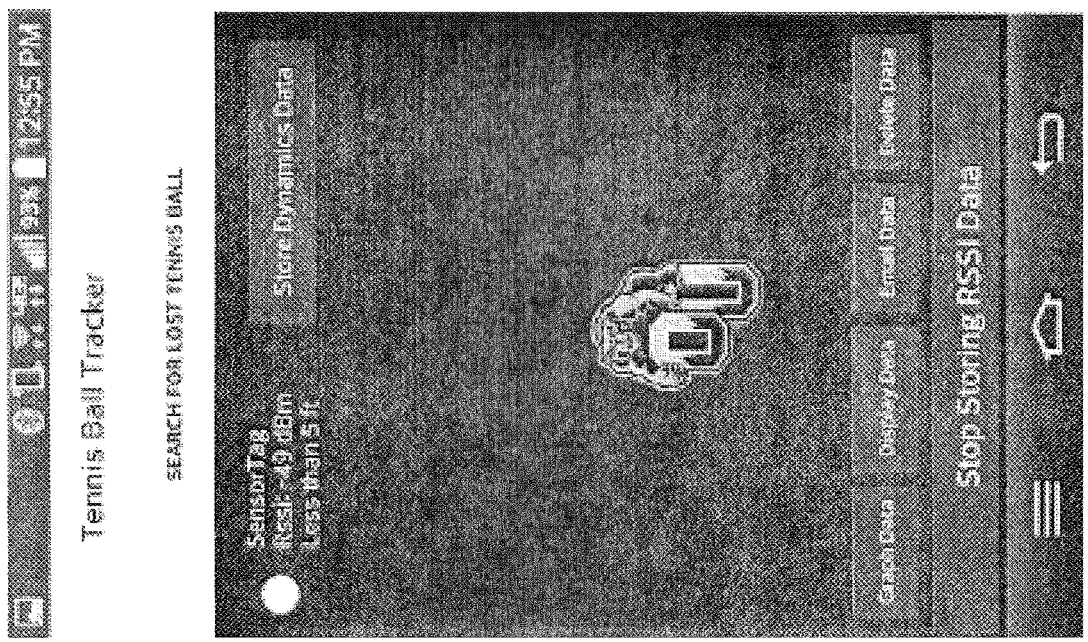
FIG. 7 depicts a sample display on a smart device in accordance with some embodiments of the present invention.

Referring to FIG. 6, one embodiment of the smart device 600 is illustrated. The smart device 600 may be a mobile device, such as Android-based smartphone, iPhone, iPad, tablet, PDA, a computer, or a server. Data from the golf ball 610 is transmitted to the smart device 600 via a communication protocol 625 described above. The smart device 600 may compute and calculate additional data or parameters based on the received data. Data from the golf ball 610 may be saved in a database created by the smart device and/or be uploaded to the Cloud via another communication protocol 630 described above for later retrieval and viewing at any location. The communication protocol 625 and the other communication protocol 630 may be the same or different. Some or all of these data may be displayed on the screen of the smart device 600. FIG. 7 depicts a sample display on a smart phone.

Figure 8:
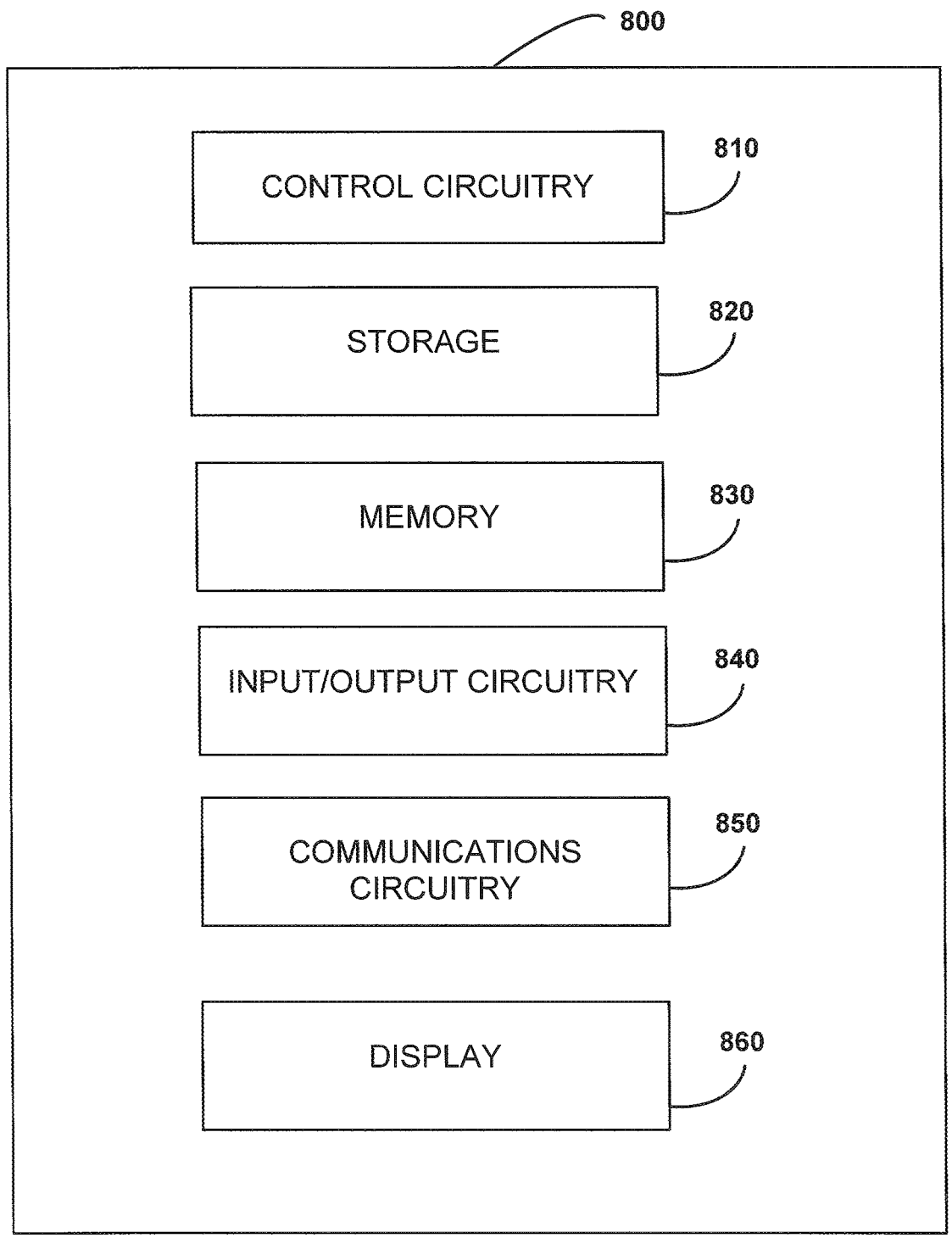
FIG. 8 depicts illustrative smart device electronics in accordance with some embodiments of the present invention.

The smart device, like the golf ball, may also include a plurality of electronics. FIG. 8 illustrates one embodiment of the smart device electronics 800. The smart device electronics 800 may comprise a processor 810, storage 820, memory 830, input/output ("I/O") circuitry 840, communications circuitry 850, and a display 860. As appreciated by those skilled in the art, the smart device electronics can include other components not combined or included in those shown in this Figure, e.g., a power supply, an input mechanism, etc.

The processor 810 may be similar or identical to the processor described above. The processor 810 or processing circuitry is operative to control the operations and performance of the smart device or the electronics in the smart device. For example, the processor 810 can be used to run operating system applications and firmware applications of the smart device or the electronics in the smart device, or other applications used by the processor 810 to communicate with the electronics in the smart device and the golf ball. In addition, the processor 810 can drive the display 860 and process inputs received from a user interface, e.g., the display 860 if it is a touch screen.

The storage 820 may include, for example, one or more tangible computer storage devices including a hard-drive, solid state drive, flash memory, permanent memory such as ROM, magnetic, optical, semiconductor, or any other suitable type of storage component, or any combination thereof. The storage 800 can store, for example, application data for implementing functions on the smart device (such as operating system applications and firmware applications for communicating with the gyroscope, accelerometer, and magnetometer), authentication information such as libraries of data associated with authorized users, data from the gyroscope, accelerometer, and magnetometer, and wireless connection data that can enable the smart device to establish a wireless connection, and any other suitable data or any combination thereof. The instructions for implementing the functions of the present invention may, as non-limiting examples, comprise non transient software and/or scripts stored in the computer-readable media 820.

The memory 830 may include cache memory, semipermanent memory such as RAM, and/or one or more types of memory used for temporarily storing data. In some embodiments, the memory 830 can also be used for storing data to operate smart device applications, or any other data from the storage 820. In some embodiments, the memory 830 and the storage 820 can be combined as a single storage medium.

The I/O circuitry 840 can be operative to convert and encode/decode, analog signals and other signals into digital data. In some embodiments, I/O circuitry 840 can also convert digital data into another type of signal, and vice-versa. For example, I/O circuitry 840 can receive and convert physical contact inputs from a multi-touch screen such as the display 860, physical movements from a mouse or sensor, analog audio signals from a microphone, or other input. The digital data can be provided to and received from the processor 810, the storage 820, and the memory 830, or any other electronic of the smart device 800. Although the I/O circuitry 840 is illustrated in this Figure as a single component of the smart device 800, several instances of I/O circuitry 840 can be included in the smart device 800.

The smart device 800 can include any suitable interface or component for allowing a user to provide inputs to the I/O circuitry 840. For example, the smart device can include a button, keypad, dial, a click wheel, or a touch screen, e.g., display 860.

The display 860 includes a display circuitry for providing a display visible to the user. For example, the display circuitry can include a screen, e.g., an LCD screen, that is incorporated in the smart device. In some embodiments, the display circuitry can include a coder/decoder (Codec) to convert digital data into analog signals and vice versa. For example, the display circuitry or other appropriate circuitry within the smart device can include Codecs necessary to process data from the gyroscope, accelerometer, and magnetometer, or any other suitable type of Codec.

The display circuitry also can include display driver circuitry, circuitry for driving display drivers, or both. The display circuitry can be operative to display content, e.g., application screens for applications implemented on the smart device 800, information regarding ongoing communications operations, information regarding incoming communications requests, or device operation screens, under the direction of the processor 810. Alternatively, the display circuitry can be operative to provide instructions to a remote display.

The communications circuitry 850 may be similar or identical to the transceiver described above. In addition, the smart device 800 can include one or more instances of the communications circuitry 850 for simultaneously performing several communications operations using different communications networks, although only one instance of the communications circuitry 850 is shown in FIG. 8 to avoid overcomplicating the drawing. For example, the smart device 800 can include a first instance of communications circuitry 850 for communicating over a cellular network to one or more of the gyroscopes, a second instance of communications circuitry 850 for communicating over Wi-Fi to one or more of the accelerometers, and a third instance of communications circuitry 850 for communicating over Bluetooth to one or more of the magnetometers. In some embodiments, the same instance of communications circuitry 850 can be operative to provide for communications over several communications networks.

The chips and circuits in all the electronics and sensors may be graphene-based. In particular, the graphene in the chips and circuits is conductive and is preferable produced via chemical vapor deposition (CVD). Conductive graphene-based chips and circuits manufactured via CVD of graphene are strengthened and more flexible compared to chips and circuits without graphene and chips and circuits manufactured via non-CVD methods. Graphene-based chips and circuits manufactured via CVD to provide conductive graphene also allow faster signal or data transmission within the chips and circuits themselves and to other electronic devices. And as noted above, the chips and circuits of the flexboard can be coated with non-conductive graphene to provide further protection as the ball is played.

The present invention provides more accurate ways to measure golf ball flight, golf ball location and golfer performance with reduced power consumption. This improvement is achieved through data collection from the gyroscope, accelerometer, and magnetometer. The data is sampled and collected in real time in a three dimension space while the golf ball is in motion, as well as after the hit or played golf ball comes to rest. The system recognizes the data from the golf ball and displays it on the smart device. The data may also contain feature points such as power-assisting path early stage corresponding feature point, motion top point corresponding feature point, and ball hitting time corresponding feature point, etc. The golf ball of the present system includes sensors to collect data at different times and each data can be recorded or analyzed individually. For example, the golf ball electronics collect data right after the golf ball is struck. The golf ball upon strike starts collecting the data from the moment it is struck until it lands on the ground and stops rolling. The golf ball data will include information during the flight of the golf ball until landing and can be analyzed to compute flight data such as speed, acceleration, rotation, force, height and range.

Velocity is a second dimension function (i.e., the integration of acceleration) and smaller than the top point feature of velocity threshold. Ball hitting is a feature point and set at an acceleration rate larger than a predetermined hitting acceleration rate. One or more of the data obtained by the gyroscope, accelerometer, and magnetometer of the golf ball are transmitted to the smart device through their corresponding transceiver and a first database storing that data is created with time stamp in the storage or memory of the smart device.

The processor of the golf ball and/or the smart device may have specialized algorithms or execute specialized instructions to calculate golf ball trajectory, golf ball speed, golf ball height, golf ball rotation, golf ball location, impact force on golf ball, effective acceleration, angular velocity, angle of flight, acceleration of gravity, distance to the pin, drive distance, training information, and any other parameters discussed herein. These parameters are determined based solely on the data gathered by the golf ball itself.

In some embodiments, the specialized algorithms may be based on Fibonacci sequence. In some embodiments, the specialized algorithms can determine the amount of time the ball is on the ground, in the air, and if it is in the hole and scores. The specialized algorithms or instructions may also determine the frequency at which the data is collected, such as 30 Hz. The calculated values are may be displayed as a plot or graph on the display of the smart device, and all the data, databases, and calculated values may be sent to the Cloud for permanent storage and viewing at any location at any time.

The processor is preferably a low power processor such as a Bluetooth low energy (BLE) processor or other processor that consumes considerably less power while maintaining its normal processing power and communication range. The processor is also preferably configured to initiate data collection on the gyroscope, accelerometer, and magnetometer, and communicates the collected data every microsecond to the smart device through a communication protocol described above. When the processor is configured to communicate the collected to the smart device, the transceiver may be configured to be off. When the processor is configured to communicate some or all of the collected to the smart device, the transceiver or communications circuitry may be configured to transmit the remaining data to the smart device. When both the processor and the transceiver are employed to communicate the collected to the smart device, the communication protocol adopted by the processor may be the same as or different from the communication protocol adopted by the transceiver. The sensors are also preferably low power sensors such as Bluetooth low energy (BLE) sensors or other sensors that consume considerably less power while maintaining their normal sensing capabilities and communication range.

The electronics of the golf ball of the present invention are also applicable to other sports balls or playing objects, such as tennis balls, baseballs, hockey pucks, basketballs, footballs, bowling balls, soccer balls, javelins, shot-put balls, hammer throws, etc.

The system, the ball and the associated electronics and the smart device may adopt any of the embodiments and configurations described herein. The object may be a ball or other similar objects that serve similar purpose as the ball. The object or the ball needs not refer to a spherical object and can take on any other forms or shapes. This system may be applicable to golf, tennis, hockey, or other similar sports. The object may be a golf ball, a tennis ball, a puck, or the like. The specialized algorithms and/or the electronics may be modified to fit the particulate sports game in order to obtain and calculate the corresponding data and parameters. The specialized algorithms and/or the electronics may also determine if the object goes through or into a net or goal and whether it scores or misses the net or goal. The specialized algorithms may further measure, if the sports game is basketball, the amount time of the ball touches the ground, the amount of time the ball is carried in hand, and the time interval between each dribble or ball bounce. In addition to assisting the user in evaluating and improving performance, such data can be collected to assist referees in determining whether such actions and motions are within the legal requirements for acceptable rather than objectionable performance (e.g., a turnover due to carrying rather than dribbling the ball).

In another variation, the present invention generally may be a system for obtaining sport-related data comprising an object having associated electronics to measure data related to the object, wherein the play of a sports game follows the state of the object as it is hit, kicked, or thrown by players; a plurality of electronics installed in a goal structure; and a smart device having associated electronics to communicate with the object and the plurality of electronics installed in a goal structure. The system, each device in the system, the associated electronics in each device, and the plurality of electronics installed in goal structure may adopt any of the embodiments and configurations described in this application.

In these variations, the object may be a ball or other similar objects that serve similar purpose as the ball. The object or the ball needs not refer to a spherical object and can take on any other forms or shapes. The sensors in the ball or object can be used to determine trajectory and accuracy of flight motion. The plurality of electronics installed in a goal structure may further comprise a near field frequency sensor in addition to the gyroscope, accelerometer, and magnetometer. This system may be applicable to basketball, soccer, or other similar sports. The object may be a basketball, a soccer ball, or other similar objects. The goal structure may be a hoop, a backboard of the hoop, the net, or any combination of the hoop, new and backboard, a soccer goal, net of the soccer goal, posts of the soccer goal, or other similar goal structures.

Other similar sports include but not limited to bowling, football, javelin, and shot-put. Other similar objects include but not limited to the corresponding objects in bowling, football, javelin, and shot-put. Other similar goal structures include but not limited to the corresponding goal structures in bowling, football, javelin, and shot-put. The specialized algorithms may be modified to fit the particulate sports game in order to obtain and calculate the corresponding data and parameters. The same type of information can be obtained for an object such as an arrow hitting a target or a discus hitting a field marker.

While all the systems and their embodiments described herein involve a combination of the golf ball and its associated electronics and the smart device and its associated electronics, other sensors or components including electronics may be installed in a goal structure, In some embodiments, the system may involve or include only one of the sensors or devices and its associated electronics or any combination of the sensors and their associated electronics, the devices and their associated electronics, and/or the plurality of electronics installed in a goal structure. In some embodiments, "involve" may mean that the system comprises all the above sensors, devices, and electronics but only certain sensors, devices, and/or electronics are configured to perform required functions. Additionally, other sensors and electronics such as radio-frequency identification (RFID) tags or other sensor tags, GPS, and antennas may also be included in or on the golf ball (or the object), the smart device, or plurality of electronics installed in a goal or net structure.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A system for locating a golf ball comprising:
a golf ball having an outer shell and internal core, with the core containing associated electronics and a battery, wherein the associated electronics of the golf ball comprise a processor and transceiver which are coated with non-conductive graphene and which are configured to measure data including acceleration, speed, travel trajectory and final rest location of the golf ball while also being configured to transmit the measured data via a communications protocol; and
a smart device having associated electronics to communicate with the golf ball, the associated electronics of the smart device comprising a processor configured to receive the measured data from the associated electronics of the golf ball;
wherein the non-conductive graphene coating allows the measured data that is to be transmitted via the communications protocol from the golf ball to the smart device to pass through the non-conductive graphene coating.

2. The system of claim 1, wherein the associated electronics of the golf ball further include a 3-axis gyroscope, a 3-axis accelerometer, and a 3-axis magnetometer.

3. The system of claim 1, wherein the outer shell of the golf ball comprises an ionomer resin and the core comprises a polybutadiene polymer.

4. The system of claim 3, wherein the graphene coated electronics are further provided with an additional moisture resistant coating to prevent water or moisture from contacting the graphene coating or electronics.

5. The system of claim 4, wherein the additional coating is a urethane conformal coating.

6. The system of claim 3, wherein the ball includes one or more additional layers of the moisture resistant coating or non-conductive graphene coating between the core and outer shell to further protect the core and electronics.

7. The system of claim 1, wherein the smart device is a smart phone or smart tablet that includes an app that calculates ball location, ball travel, ball velocity, or ball trajectory from the data provided by the electronics from the ball through the cloud.

8. The system of claim 7, wherein the app measures how close the golf ball is to the smart device with different colors used to indicate different distances between the smart device and the ball.

9. The system of claim 8, wherein the app uses the color red as an indication of the golf ball is more than 75 feet away, the color yellow as an indication that the ball is within 50 feet, and the color green as an indication that the ball is within 10 feet of the smart device.

10. The system of claim 1, wherein the processor of the golf ball is programmed with algorithms based on Fibonacci sequence, and is configured to measure acceleration of the golf ball by using the algorithms based on the Fibonacci sequence.

11. The ball or sports game implement of claim 1, wherein the non-conductive graphene coating has a thickness of 25 µm.

12. The system according to claim 1, wherein the associated electronics of the golf ball are configured to measure data related to the golf ball on 30 Hz basis.

13. A ball or sports game implement that provides sports related data and that includes associated electronics to measure data related to the playing or the ball or game implement; wherein the associated electronics of the ball or game implement comprise a processor and transceiver that are coated with non-conductive graphene, the processor and transceiver are configured to measure acceleration of the ball or game implement by using the algorithms while also being configured to transmit the measured acceleration of the ball or game implement via a communications protocol to a smart device, and;
wherein the non-conductive graphene coating allows the measured acceleration that is to be transmitted via the communications protocol from the ball or sports game implement to the smart device to pass through the non-conductive graphene coating.

14. The ball or sports game implement of claim 13, wherein the processor of the ball or sports game implement is programmed with algorithms based on Fibonacci sequence, and is configured to measure acceleration of the ball or sports game implement by using the algorithms based on the Fibonacci sequence.

15. The ball or sports game implement of claim 13, which is a golf ball, baseball, football, basketball, hockey puck, soccer ball, tennis ball, bowling ball, javelin, discuss, shot-put, badminton birdie or arrow.

16. The ball or sports game implement of claim 13, wherein the measured acceleration is transmitted to a smart device having associated electronics to communicate with the ball or sports game implement, the associated electronics of the smart device comprising a processor configured to receive the measured data from the associated electronics of the ball or sports game implement.

17. The ball or sports game implement of claim 13, which includes one or more additional layers of moisture resistant coating or the non-conductive graphene coating upon the non-conductive graphene coating to further protect the electronics.

18. The ball or sports game implement of claim 13, wherein the non-conductive graphene coating has a thickness of 25 µm.

19. The ball or sports game implement of claim 13, wherein the processor and transceiver are further configured to measure data including one or all of rotation data, acceleration data, or location data.

20. A ball or sports game implement that provides sports related data and that includes associated electronics to measure data related to the playing or the ball or game implement; wherein the associated electronics of the ball or game implement comprise a processor and transceiver that are coated with non-conductive graphene, the processor is programmed with algorithms based on Fibonacci sequence and is configured to measure acceleration of the ball or sports game implement by using the algorithms based on the Fibonacci sequence, and the transceiver is configured to transmit the measured acceleration of the ball or game implement via a communications protocol to a smart device, and;
wherein the non-conductive graphene coating allows the measured acceleration that is to be transmitted via the communications protocol from the ball or sports game implement to the smart device to pass through the non-conductive graphene coating.

* * * * *